(12) United States Patent
Roehl et al.

(10) Patent No.: US 6,241,309 B1
(45) Date of Patent: Jun. 5, 2001

(54) REINFORCEMENT FOR A UNITIZED BODY OF A MOTOR VEHICLE AND METHOD OF MAKING SAME

(75) Inventors: Wolfgang Roehl, Sindelfingen; Joerg Sikorski, Stuttgart, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/391,597

(22) Filed: Sep. 8, 1999

(30) Foreign Application Priority Data

Sep. 19, 1998 (DE) .............................................. 198 43 024

(51) Int. Cl.$^7$ .................................................. B62D 25/08
(52) U.S. Cl. ............................ 296/188; 296/198; 296/30
(58) Field of Search .................................... 296/198, 188, 296/30, 195, 203.04

(56) References Cited

U.S. PATENT DOCUMENTS

| | | | |
|---|---|---|---|
| 4,634,174 | * | 1/1987 | Kamiya .................................. 296/195 |
| 5,036,570 | * | 8/1991 | Glickenberger ....................... 296/195 |
| 5,123,696 | * | 6/1992 | Watari ................................ 296/30 X |
| 5,350,214 | * | 9/1994 | Yamouchi et al. .............. 296/198 X |

FOREIGN PATENT DOCUMENTS

| | | |
|---|---|---|
| 1455679 | 3/1969 | (DE) . |
| 4445327C1 | 4/1996 | (DE) . |
| 405338558 * | 12/1993 | (JP) ...................................... 296/198 |

OTHER PUBLICATIONS

Patent Abstracts of Japan, 10007026A, Jan. 13, 1998; Car Vody Rear Part Structure of Automobile.
Patent Abstracts of Japan, 09240510A, Sep. 16, 1997; Body Rear Part Structure of Automobile.

* cited by examiner

Primary Examiner—Joseph D. Pape
(74) Attorney, Agent, or Firm—Evenson, McKeown, Edwards & Lenahan, P.L.L.C.

(57) ABSTRACT

A reinforcement for a unitized body of a motor vehicle is located in a transverse plane of the vehicle that lies between lateral wheel housings and has a transverse beam that connects the wheel housings with one another in the upper area. The transverse beam is located in an overlapping area with a supporting plate of a parcel shelf at the rear wheel housings and is connected in a reinforcing manner with the supporting plate.

26 Claims, 2 Drawing Sheets

REINFORCEMENT FOR A UNITIZED BODY OF A MOTOR VEHICLE AND METHOD OF MAKING SAME

BACKGROUND AND SUMMARY OF THE INVENTION

This application claims the priority of German application 198 43 024.8, filed in Germany on Sep. 19, 1998, the disclosure of which is expressly incorporated by reference herein.

The invention relates to a reinforcement for a unitized body of a motor vehicle, which is located in a transverse plane between the wheel housings.

A reinforcement of this kind is known from German Patent 14 55 679, and relates to an end unit as an assembly for unitized bodies of motor vehicles. The end unit is designed as the front area of a motor vehicle with vertical side walls, each of said walls being provided with an indentation for wheels. In the vicinity of these indentations, a hat-shaped tower is provided in each side wall, said tower being connected with the respective side wall in the vicinity of the wheel housings with the aid of flanges. The hat-shaped tower serves to attach a shock absorber for example.

A transverse beam is located approximately at the level of the lower end of the windshield, said member being located in a transverse plane of the vehicle located between the wheel housings, and the two front chassis towers are connected permanently with one another in its upper area. In addition, the transverse beam is connected at each of its ends by a pressed panel with the side walls. The transverse beam is fastened to the pressed panels with the aid of a gusset that extends outward in the direction of the side walls, said gusset providing a three-dimensional support for the vehicle towers.

Since only the transverse beam is provided in the vicinity at the level of the side wall of the vehicle to stiffen the structure of the body-in-white, only a limited rigidity, especially torsional stiffness, is provided for the body-in-white.

A goal of the invention is to provide a reinforcement for a unitized body of a motor vehicle of the type described, which improves the stiffness of the body-in-white.

This goal is achieved according to the invention by a reinforcement of a unitized body of a motor vehicle, which is located in a transverse plane of the vehicle between lateral wheel housings, and which comprises a transverse beam that connects the wheel housings with one another in an upper area, wherein the transverse beam is located on the rear wheel housings and connected in an overlapping area in a reinforcing manner with a supporting plate of a parcel shelf.

In the reinforcement according to the invention, the transverse beam is located in the overlapping area together with a supporting plate of a parcel shelf at the rear wheel housings and is connected in a reinforcing manner with the supporting plate. By locating both the supporting plate and the transverse beam at the wheel arches, an especially stable reinforcement is produced that is very suitable for receiving torsional forces and especially clearly improves the torsional stiffness of the unitized body. In an advantageous manner, the transverse beam also improves the denting resistance of the supporting plate and prevents oscillation and flexing, especially in the vertical direction of the vehicle. The supporting plate is especially suited for accepting forces in the lengthwise direction of the vehicle, so that a reinforcement is produced overall that opposes the torsional forces.

Advantageous features of preferred embodiments of the reinforcement according to the invention are described herein and in the claims.

Thus, it has been found to be especially advantageous to make the transverse beam with a profile that is open on one side, said profile being able to be connected with the supporting plate to form a profile that is closed at least in certain areas. Thus, the tension strut for example can be shaped in simple fashion from sheet steel and then connected at least partially with the supporting plate. If the transverse beam is connected with the supporting plate over larger areas or over its entire length, the flexing of the supporting plate in the vertical direction of the vehicle can be significantly reduced.

If a damper tower is associated with the upper areas of each of the wheel housings, the transverse beam can be secured to the damper towers. The forces transmitted by the chassis to the damper towers can be accepted especially well by the transverse beam and the supporting plate. As a result, especially favorable torsional stiffness properties of the entire body-in-white can be achieved.

If the damper towers penetrate the supporting plate, an especially stable connection can be formed between the damper towers and the supporting plate, with the transverse beam located on the top of the supporting plate additionally allowing an extensive introduction of force from the damper towers into the transverse beam.

The supporting shoes at the ends of the transverse beam result in a large force-introduction-node between the damper towers and the transverse beam. These nodes can be enlarged even further by angle reinforcements located on the underside of the supporting plate which likewise are connected with the damper towers.

If recesses extending laterally outward from the tower openings are provided in the supporting plate, when assembly takes place, the supporting plate can be installed after the damper towers and side braces have already been installed, before the transverse beam and the angle reinforcements are attached.

Finally, it has been found to be especially advantageous to limit the supporting plate with front and rear supporting profiles that also provide support in order to make the supporting plate stiffer and especially to counteract the vertical flexing and oscillation in the vertical direction of the vehicle.

Other objects, advantages and novel features of the present invention will become apparent from the following detailed description of the invention when considered in conjunction with the accompanying drawings.

DETAILED DESCRIPTION OF THE INVENTION

Figure 1:
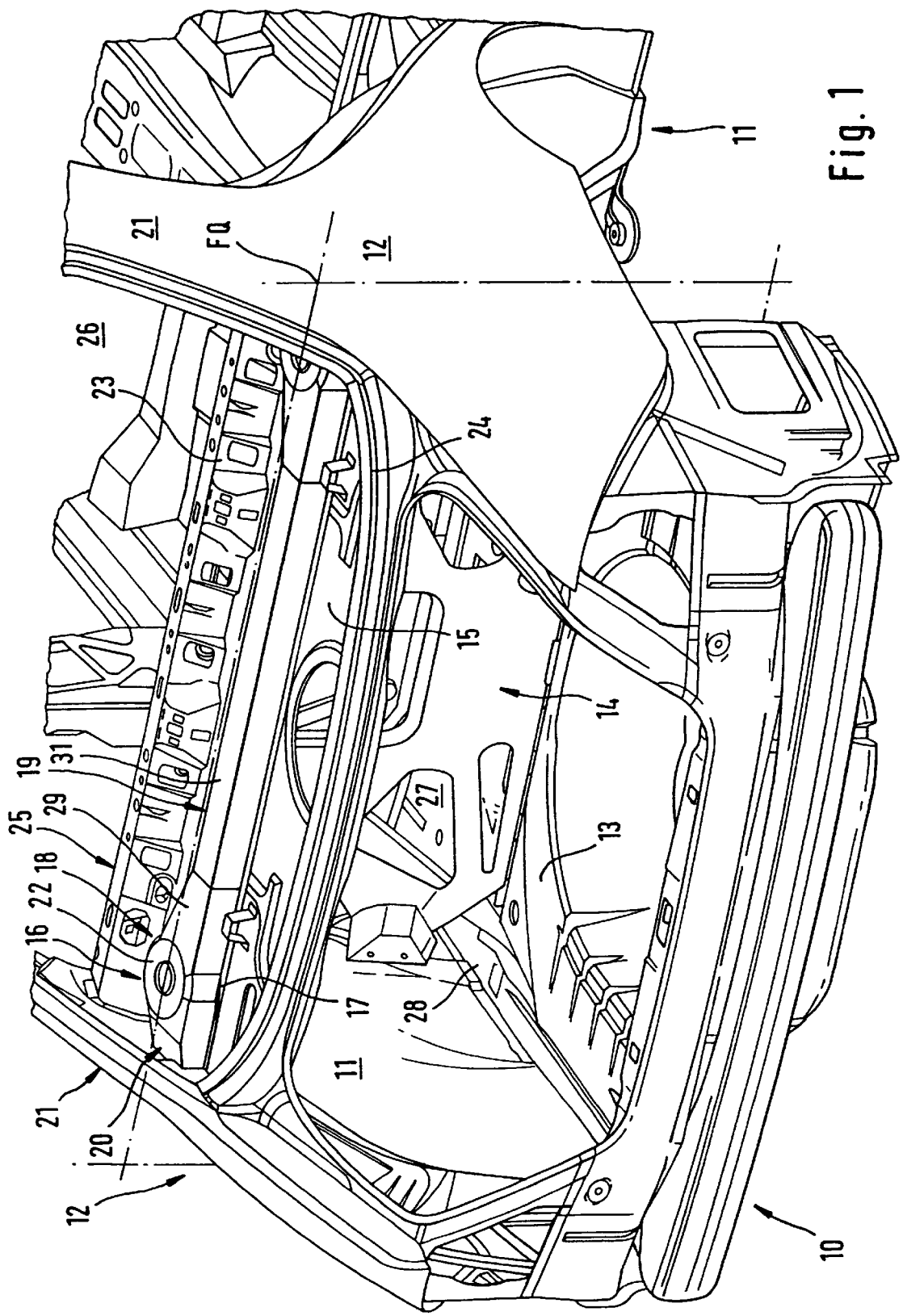
FIG. 1 is a perspective view of the rear of a unitized body with a reinforcement constructed according to a preferred embodiment of the invention.

FIG. 1 shows a perspective view of the rear of a unitized body with a trunk 10 that is delimited laterally by side walls 12 provided with wheel housings 11, at the bottom by a trunk floor 13, and at the front by a partition 14. In its front area, the trunk floor 10 is delimited at the top by a supporting plate 15 of a parcel shelf that extends roughly horizontally slightly below the lower edge of a vehicle rear window, not shown, and consists of a shaped piece of steel sheet. The wheel housings 11 located laterally include frustroconical or approximately cylindrical damping towers 16 in their upper area that serve to accept vehicle damping members. Supporting plate 15 is traversed by tower openings 17 in the upper ends 18 of the damper towers 16, which are permanently connected with supporting plate 15.

Between the upper ends of the damper towers 16 a transverse beam 19 is located that is secured in the overlapping area to the supporting plate 15 at its top and with the damper towers 16. Both the damper towers 16 and the transverse beam 19 lie in an approximately vertical vehicle transverse plane FQ with the supporting plate 15 extending approximately at right angles to this vehicle transverse plane FQ. The top of transverse beam 19 and upper ends 22 of damper towers 16 extend in a plane approximately at the level of the lower edge of the rear window. The transverse beam 19 is extended by two side braces 20 up to the side walls 12 of the unitized body in the vicinity of C-pillars 21. The design and fastening of side braces 20 will now be described in greater detail especially with reference to FIG. 2.

Supporting plate 15 is delimited by co-supporting front and rear supporting profiles 23, 24, which are likewise fastened to the side walls 12 of the unitized body in the vicinity of C-pillars 21. The rear supporting profile 24 forms the lower edge of the rear window and the transitional area between the rear window and a trunk lid, likewise not shown. The front supporting profile 23 forms the upper end of a front partition 25 that delimits a passenger compartment 26 at the rear, extends in the transverse direction of the vehicle in an upright position, and is fastened next to the front supporting profile 23 of the supporting plate 15 to the side walls 12 and to a passenger compartment floor, not shown. Together with the partition 14, side walls 12, and supporting plate 15, the front partition 25 delimits a receiving space 27 which in this case serves to receive a fuel tank, not shown. The corner area between the wheel housings 11 and the trunk floor 13 is formed in each case by a side member 28 that extends in the lengthwise direction of the vehicle. The wheel housings 11 are located in the side walls 12 together with the associated damper towers.

The wheel housings 11 located in the side walls 12 with the associated damper towers 16 and the trunk floor 14, together with the supporting plate 15 and transverse beam 19 fastened to it and to the damper towers 16, together form a box-shaped structure of the unitized body, with the supporting plate 15 and the transverse beam 19 in particular increasing the torsional strength of the body. The special function and design of transverse beam 19 and the supporting plate 15 will be described in greater detail with reference to FIGS. 2 and 3.

Figure 2:
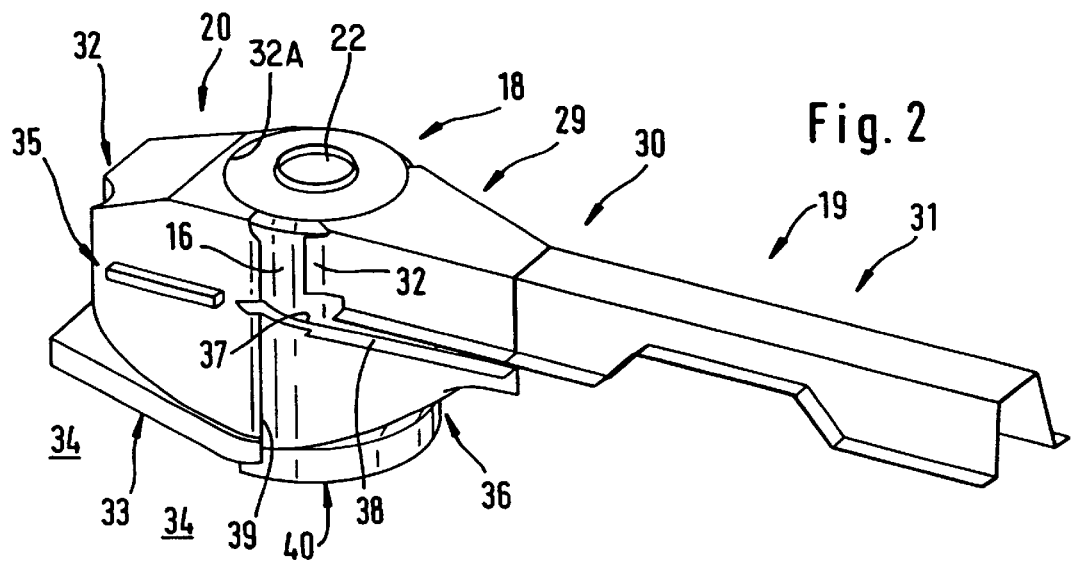
FIG. 2 is a perspective view of a transverse beam in the vicinity of a damper tower with an associated angle reinforcement and side brace of the reinforcement constructed according to a preferred embodiment of the invention.

In FIG. 2, the transverse beam 19 is shown in the vicinity of one of the damper towers 16, with the supporting plate 15 being omitted in this view in order to show clearly the arrangement of the side brace 20 on the damper tower 16 and an angle reinforcement associated with transverse beam 19. In order to achieve an especially good reinforcing effect, the transverse beam 19 is displaced rearward relative to damper tower 16 by a small amount in the lengthwise direction of the vehicle. Transverse beam 19 is expanded at its ends that face the damper towers 16 by supporting shoes 29 which, to compensate length tolerances in the vicinity of a welded section 30, are fastened especially by a spot-welded connection to a middle section 31 of transverse beam 19. Supporting shoe 29 is preferably shaped from a piece of sheet steel and expands starting at middle section 31 essentially in the shape of the frustrum of a pyramid in the direction of damper tower 16, with the supporting shoe 29 being adapted in the contact area to the damper tower 16 and having tabs 32 that provide extensive support and fastening for supporting shoe 29 to the damper tower 16. As a result of this broad support for support shoe 29 with the profile that is expanded relative to central section 31, overall an extensive connection of transverse beam 19 to damper tower 16 is created for introducing force.

The side brace 20 located between the side wall 12 and the associated damper tower 16, starting at the side wall and the C-pillar 21, is expanded in the direction opposite the damper tower 16 likewise essentially in the shape of a frustrum of a pyramid and is secured at an extensive supporting area 32A both to the side wall 12 and the C-pillar 21 as well as at the damper tower 16 by welded connections, especially spot-welded connections. In addition, the respective side brace 20 is secured by a lower supporting area 33 to an upper area 34 of the associated wheel housing 11, especially by spot welds. At the level of the underside of the supporting plate 15, not shown here, brackets 35 are located on the side brace 20 that serve to support the supporting plate 15 that is cut out in the vicinity of the side braces 20 with a supporting plate 15 being secured to the brackets 35 of the side braces 20 by spot welds.

The transverse beam 19 is associated at each damper tower 16 with an angle reinforcement 36 that is separated by supporting plate 15 from transverse beam 19. The angle reinforcement 36 is fastened by an upper angle area 37 with the aid of tabs 38 at the supporting plate 15 and to the damper tower 16 by a lateral angle section 39, preferably by spot welding. In addition, the angle reinforcement 36 is attached to a lower angle section 40 at the upper area 34 of the associated wheel housing 11.

Figure 3:
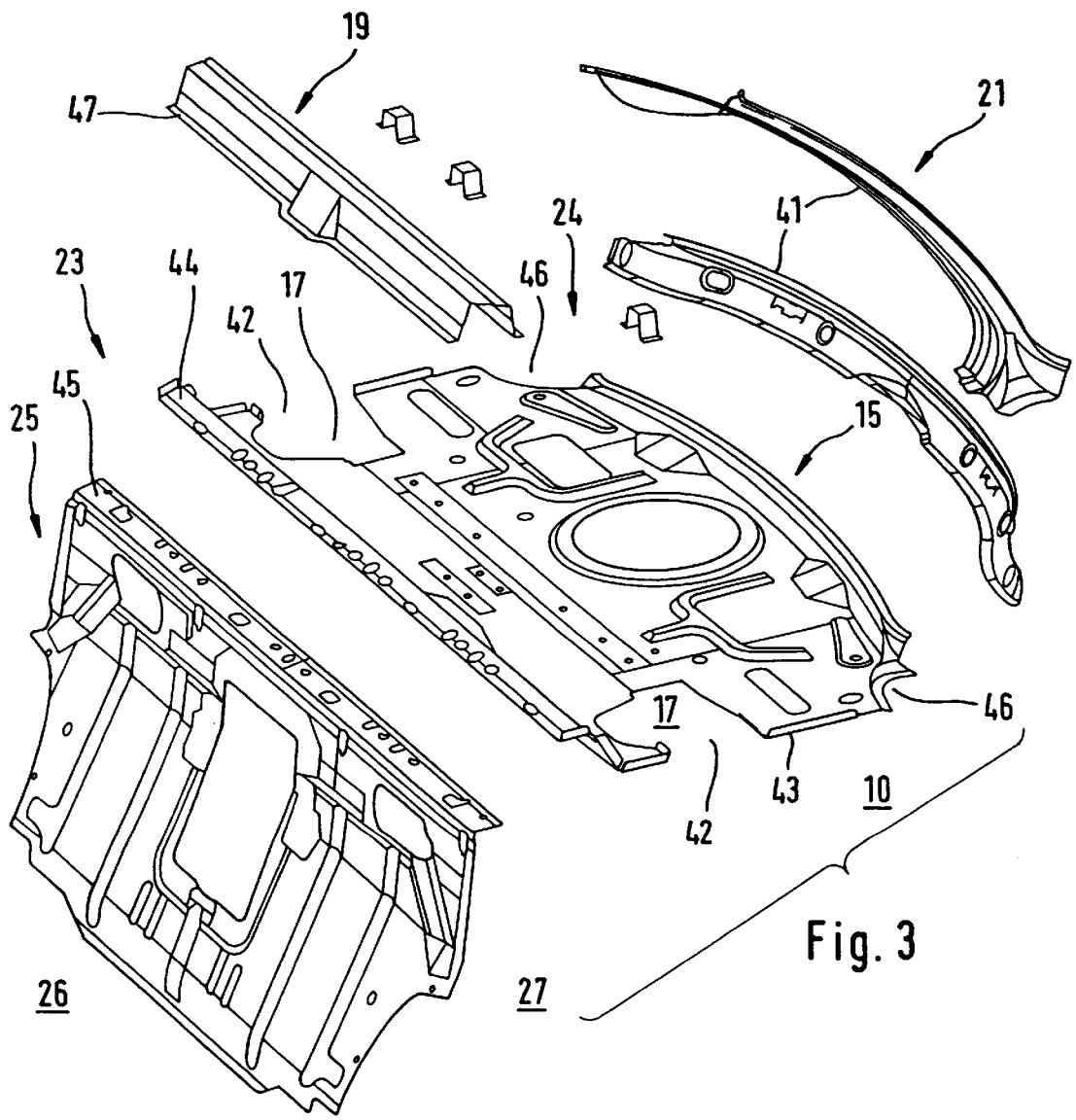
FIG. 3 is an exploded view of a supporting plate with a transverse beam and a front partition of the reinforcement constructed according to a preferred embodiment of the invention.

FIG. 3 shows an exploded view of supporting plate 15 with transverse beam 19, front partition 25, and a supporting profile 41 of C-pillar 21. In the supporting plate 15, recesses 42 that extend laterally externally from the tower opening 17 can be seen that are adapted to the side braces 20. Side tabs 43 are provided laterally on supporting plate 15, with which the supporting plate 15 can be fastened additionally to the corresponding side wall 12. The supporting profile 23 that delimits supporting plate 15 at the front and has a reinforcing effect is connected with the front partition 25 along contact areas 44, 45 by means of spot welds. In the rear area of supporting plate 15, as an extension of the rear supporting profile 24, rear recesses 46 are provided that serve to receive and secure the supporting profiles 41 of C-pillar 21 to the supporting plate 15. The transverse beam 19 that is shaped from sheet steel, of which only the central section 31 is visible in FIG. 3, has a U-shaped profile open on one side with transverse beam tabs 47 shaped thereon, which can be connected with supporting plate 15 to form a profile that is closed at least in sections. For this purpose, transverse beam 19 is secured by the transverse beam tabs 47 to the supporting plate 15 by means of spot welds.

Embodiments within the scope of the invention include a construction with the transverse beam 19 and the supporting shoes 29 made in one piece. It is also contemplated according to other embodiments to make the transverse beam 19 and the side braces 20 in one piece, with the transverse beam 19 then extending over the entire width of the vehicle between the two side walls 12.

In addition, embodiments contemplated by the invention provide that instead of the welded connections, especially spot-welded connections, other connections such as bolted connections Ucan be used to join the body parts in question.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A reinforcement assembly for a unitized body of a motor vehicle, which is located in a transverse plane of the vehicle between lateral rear wheel housings, and which comprises a transverse beam connecting the rear wheel housings with one another in an upper area, wherein the transverse beam is located on the rear wheel housings and connected in a reinforcing manner overlappingly with a supporting plate of a parcel shelf.

2. The reinforcement assembly according to claim 1, wherein the transverse beam has a profile open on one side that is connected with the supporting plate to form an at least partially closed profile.

3. The reinforcement assembly according to claim 1, wherein each of the wheel housings comprises a damping tower in an upper area to which an associated end of the transverse beam is secured.

4. The reinforcement assembly according to claim 3, wherein the supporting plate is traversed in a vicinity of openings accommodating the damping towers by the damping towers and the transverse beam is secured to the top of the supporting plate.

5. The reinforcement assembly according to claim 3, wherein the top of the transverse beam and the damper towers lie in a plane that extends approximately at a level of a lower edge of a rear window.

6. The reinforcement assembly according to claim 3, wherein the transverse beam is expanded at its ends facing the damper towers by support shoes.

7. The reinforcement assembly according to claim 3, wherein the ends of the transverse beam are associated with two separate lower angle reinforcements separated by the supporting plate, said reinforcements being permanently attached to the supporting plate and to one of the wheel housings or damper towers.

8. The reinforcement assembly according to claim 3, wherein the transverse beam is extended by two side braces up to side walls, which said side braces are fastened between respective side walls and the associated wheel housings or damper towers.

9. The reinforcement assembly according to claim 8, wherein the profiles of the side braces are expanded at their ends that face the damping towers.

10. The reinforcement assembly according to claim 8, wherein the supporting plate has recesses that extend laterally outward from openings accommodating the damper towers and that accommodate the side braces.

11. The reinforcement assembly according to claim 10, wherein the side braces have brackets in the vicinity of the recesses for connecting the supporting plate with the side braces.

12. The reinforcement assembly according to claim 3, wherein the damping towers, at least in the vicinity of their upper ends, are designed to be approximately frustroconical or cylindrical.

13. The reinforcement assembly according to claim 1, wherein the supporting plate is delimited by co-supporting front and rear support profiles.

14. A unitized motor vehicle body assembly comprising;

a pair of laterally spaced vehicle side walls, a pair of wheel housings bounded by respective ones of the side walls, said wheel housings including respective damping towers at their upper ends which in use serve to accept damping members, a cross wall connecting the side walls and having a rear window opening, a trunk floor connecting the side walls, an upwardly extending trunk wall partition at a front of the trunk floor, a supporting plate of a parcel shelf extending laterally and substantially horizontally at a top of the trunk wall partition and slightly below the rear window opening, said supporting plate including openings for the damping towers and being connected with the damping towers, and a transverse reinforcing beam connected to the damping towers and to an upper side of the supporting plate.

15. An assembly according to claim 14, wherein said transverse reinforcing beam is connected by spot welds to the damping towers and the supporting plate.

16. An assembly according to claim 14, wherein the transverse beam has a profile open on one side that is connected with the supporting plate to form an at least partially closed profile.

17. An assembly according to claim 14, wherein the transverse beam is expanded at its ends facing the damper towers by support shoes.

18. An assembly according to claim 17, wherein the ends of the transverse beam are associated with two separate lower angle reinforcements separated by the supporting plate, said reinforcements being permanently attached to the supporting plate and to one of the wheel housings or damper towers.

19. An assembly according to claim 14, wherein the transverse beam is extended by two side braces up to side walls, which said side braces are fastened between respective side walls and the associated wheel housings or damper towers.

20. An assembly according to claim 19, wherein the profiles of the side braces are expanded at their ends that face the damping towers.

21. An assembly according to claim 20, wherein the supporting plate has recesses that extend laterally outward from the openings for the damping towers and that accommodate the side braces.

22. An assembly according to claim 21, wherein the side braces have brackets in the vicinity of the recesses for connecting the supporting plate with the side braces.

23. An assembly according to claim 14, wherein the damping towers, at least in the vicinity of their upper ends, are designed to be approximately frustroconical or cylindrical.

24. An assembly according to claim 14, wherein the supporting plate is delimited by co-supporting front and rear support profiles.

25. A method of making a reinforcement assembly for a unitized body of a motor vehicle, which is located in a transverse plane of the vehicle between lateral rear wheel housings, and which comprises a transverse beam connecting the wheel housings with one another in an upper area, wherein the transverse beam is located on the rear wheel housings and connected in a reinforcing manner overlappingly with a supporting plate of a parcel shelf, said method comprising connecting the reinforcing beam to the damping towers and to the upper side of the supporting plate.

26. A method according to claim 25, wherein said connecting includes spot welding of the reinforcing beam to the damping towers and to the upper side of the supporting plate.

* * * * *